United States Patent
Kekki

(10) Patent No.: US 7,760,646 B2
(45) Date of Patent: Jul. 20, 2010

(54) CONGESTION NOTIFICATION IN 3G RADIO ACCESS

(75) Inventor: Sami J. Kekki, Helsinki (FI)

(73) Assignee: Nokia Corporation, Espoo (FI)

( * ) Notice: Subject to any disclaimer, the term of this patent is extended or adjusted under 35 U.S.C. 154(b) by 594 days.

(21) Appl. No.: 11/344,155

(22) Filed: Feb. 1, 2006

(65) Prior Publication Data

US 2006/0176810 A1    Aug. 10, 2006

Related U.S. Application Data

(60) Provisional application No. 60/650,980, filed on Feb. 9, 2005.

(51) Int. Cl.
*H04L 1/00* (2006.01)
(52) U.S. Cl. ................ 370/236; 370/229; 370/230; 370/231; 370/232; 370/235
(58) Field of Classification Search ............. 370/229, 370/235, 237, 238, 238.1, 351, 389, 395.1; 379/111, 112.01, 112.05
See application file for complete search history.

(56) References Cited

U.S. PATENT DOCUMENTS

| | | | |
|---|---|---|---|
| 5,737,313 A | 4/1998 | Kolarov et al. | |
| 6,658,008 B1 * | 12/2003 | Hosein | 370/395.64 |
| 6,741,555 B1 * | 5/2004 | Li et al. | 370/229 |
| 6,813,245 B1 * | 11/2004 | Furuno | 370/236 |
| 7,072,302 B1 * | 7/2006 | Storr | 370/236.1 |
| 7,457,245 B2 * | 11/2008 | McAlpine et al. | 370/230 |
| 2003/0174700 A1 * | 9/2003 | Ofek et al. | 370/389 |
| 2005/0185650 A1 * | 8/2005 | Neustadt et al. | 370/395.1 |

FOREIGN PATENT DOCUMENTS

JP    10-4419 A    1/1998
WO    WO 00/65782    11/2000

OTHER PUBLICATIONS

Ramakrishnan, K. et al., "A Proposal to Add Explicit Congestion Notification (ECN) to IP", XP-15030961A, Jul. 1998, pp. 1-19.
"3rd Generation Partnership Project; Technical Specification Group Radio Access Network; Iub/Iur Congestion Control; (Release 6)", 3GPP TR 25.902 V1.0.0., Jun. 2005, pp. 1-15.
Official Communication issued in the corresponding JP Patent Application No. 2007-552754, dated Nov. 20, 2009.

* cited by examiner

*Primary Examiner*—Chi H Pham
*Assistant Examiner*—Weibin Huang
(74) *Attorney, Agent, or Firm*—Squire, Sanders & Dempsey L.L.P.

(57) ABSTRACT

A method, apparatus and system of network congestion notification is disclosed. A source node sends a destination node a data packet. Upon receipt of the data packet if network congestion is detected, the destination node introduces a congestion indication into a data packet. The data packet, including the congestion indication, is sent to the source node.

20 Claims, 5 Drawing Sheets

CONGESTION NOTIFICATION IN 3G RADIO ACCESS

BACKGROUND OF THE INVENTION

1. Field of the Invention

This invention is related to the field of Third Generation (3G) radio access network, traffic management, congestion notification and avoidance.

2. Description of the Related Art

Congestion occurs in high bit-rate radio bearers and access network systems. Congestion control is a complex issue because it is not isolated to one single level of protocol hierarchy. It is partially implemented in the routers or switches inside the network and partially in the transport protocol running on host machines.

One mechanism for congestion control deals with the allocation of resources at the destination, such as memory and processing. Generally, in accordance with flow control, the destination sets a limit on the transmission rate at which each source sending data to the destination may transmit that data. The sources and the destinations coordinate the transfer of data by an exchange of messages containing requests and acknowledgements. Before the source starts sending datagrams, such as data packets, it will send a request to the destination seeking permission to begin transmission. In response to the request, the destination send a message containing an identification of the number of packets the source may dispatch toward the destination without further authorization. This number is commonly referred to as window size. The source then proceeds to transmit the authorized number of packets toward the destination and waits for the destination successfully receives a packet, it sends a message back to the source containing an acknowledgement indicating the successful receipt of the packet and, in some cases, authorizing the source to send another packet. In this way, the number of packets on the network traveling from the source toward the destination will never be more than the authorized window size.

This mechanism, however, does not satisfactorily deal with the distribution of traffic within the network. Even with this mechanism in place, on a busy network it is likely that many sources will simultaneously send traffic over the network to more than one destination. If too much of this traffic converges on a single router in too short a time, the limited buffer capacity of the router or communication gateway will reject or destroy the packets. At this time, the network is considered to be congested.

Once the network is congested, network performance degrades significantly. The affected sources have to retransmit the lost or rejected packets. Re-transmissions, however, necessarily use network resources such as buffer storage, processing time and link bandwidth to handle old traffic, thereby leaving fewer resources for handling those portions of the messages still waiting to be transmitted for the first time. When that occurs, network delays increase drastically and network throughput drops. Since some network resources are being dedicated to handle re-transmissions at a time when the network is already experiencing a heavy load, there is a substantial risk of the congestion spreading and thereby locking up the entire network.

There are two general approaches to handle network congestion. One approach is strict resource reservation which placing limitations on the amount of traffic which will be permitted on the network at any given time. Examples include the pre-allocation of buffers at the routers to ensure that memory is available to store arriving packets until they can be forwarded. The second approach is congestion control.

In the first approach, overload is avoided through admission blocking, while the second approach trusts methods to alleviate the congestion at times when the congestion is detected. TCP/IP is a typical example of a protocol supporting the first approach, where TCP reacts by reducing its load at times when congestion is identified in the end-to-end path. TCP assumes a packet loss is an indication of an overload, which is typically the case in IP networks. Strict resource reservation of transport resources for channels may be expensive due to high peak data rates of the connections. Statistical multiplexing of bursty packet-data can result in large savings in the transport network deployment.

Resource reservation can employ the risk of transport network overload. The overload can have severe effects on the end-user performance, unless any methods to alleviate the congestion are available. This is because losses in the Transport Network Layer (TNL) will result in RLC re-transmission requests, potentially resulting in a continuous overload of the transport network. The RLC re-transmission rate would rise, the throughput would conversely plunge, but the transport network congestion would prevail. RLC "shields" the TNL losses from the end-to-end protocols, meaning that e.g. TCP will not observe the congestion related losses in the transport network.

Problems exist regarding alerting the sender of data aware of detected congestion in interfaces. Though there are means available for a receiving end of an interface to detect congestion, there are no means available to notify the sender of data or protocol data units (PDUs) about congestion.

SUMMARY OF THE INVENTION

In one example of the invention, a method for congestion notification in a network is described. The method includes transmitting, at a source node, data packets to a destination node, each data packet including a header. The method further includes determining if congestion is encountered and introducing an indication of network congestion in a portion of the data packet. Further, the method includes transmitting, at a receiver node, the data packet to a source node of the data packet with the indication of network congestion.

In another example, an apparatus for congestion notification in a network is described. The apparatus includes a first transmitting means for transmitting, at a source node, data packets to a destination node, each data packet including a header. The apparatus further includes a determining means for determining if congestion is encountered and an insertion means for introducing an indication of network congestion in a portion of the data packet. Further, the apparatus includes and a second transmitting means for transmitting, at a receiver node, the data packet to a source node of the data packet with the indication of network congestion.

In still another example, a system for congestion notification is described. The system includes a determination module that determines network congestion upon the receipt of a data packet. The system further includes a congestion indication module that introduces an indication of network congestion into a data packet. Further, the system includes a transmitting module that transmits a data packet to the source of the data packet, where the data packet includes the indication of network congestion.

DETAILED DESCRIPTION OF THE PREFERRED EMBODIMENT(S)

The present invention is directed to the problem of how to make a sender of data aware of detected congestion in Iub and Iur interfaces. There are systems currently available in 3GPP Terrestrial Radio Access Network (UTRAN) for the receiving end of the interface to detect the congestion in the interface. In this system, the detection can be based on monitoring the transport delay and detecting the increase in it, or on monitoring the sequence of the received protocol data units (PDUs) and detecting a loss of PDUs in the sequence. However, there are no systems available for notifying the sender of the PDUs about the congestion. It is an important feature of embodiments of the invention that the sender is made aware of the congestion so that the sender can react appropriately, and therefore reduces a probability of increasing the level of congestion, or extending the duration of the congestion.

Figure 1:
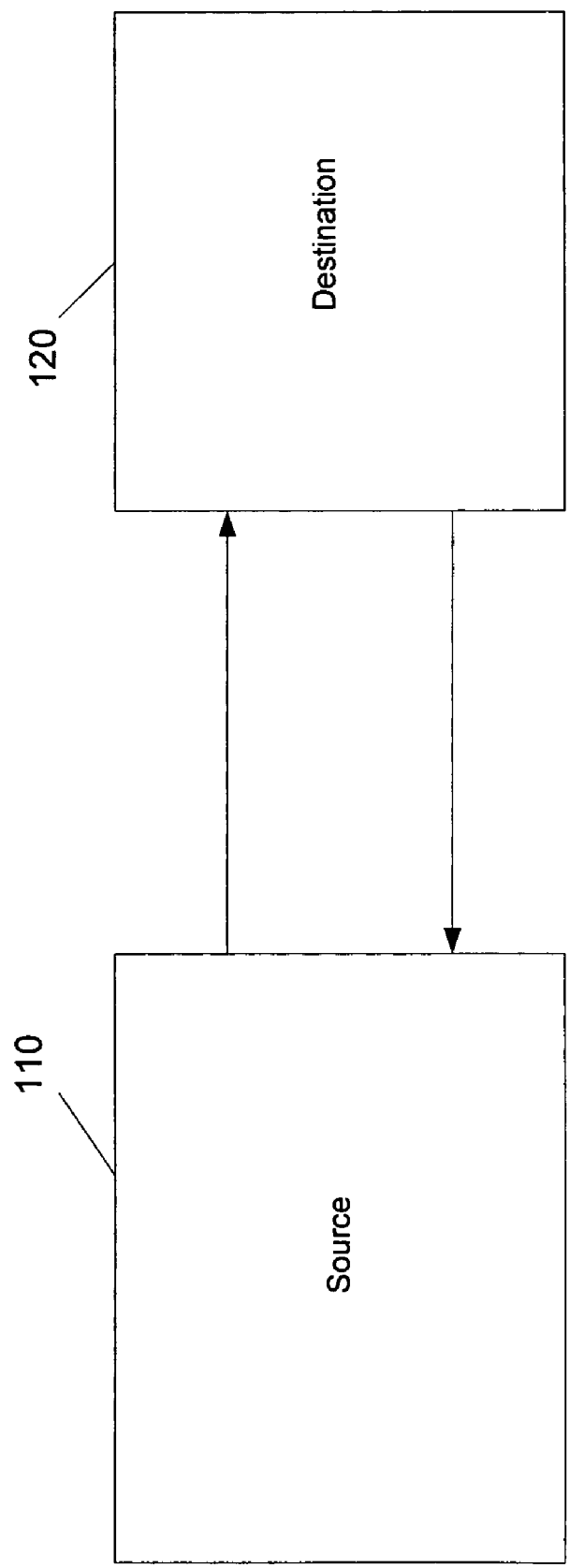
FIG. 1 illustrates an example of a packet-switch network according to an example of the invention.

There are several ways of notifying the sender of the data of the detected congestion. FIG. 1 is an example packet-switch network 100. As shown in FIG. 1, the packet-switched network 100 includes, a source node 110 and a destination node 120. Links 202 and 204 are used to connect the source node 110 to the destination node 120. The packet-switched network may include an TCP/IP network of an Internet Service Provider (ISP), an Internet and different source and destination networks, including, for example, a packet switched network that links the source node 110 and the destination node 120.

The source node 110 and destination node 120 are known include but are not limited to, PCs, workstations, mainframes, file servers, storage devices and other types of computers, as well as, a router or a communication gateway containing a number of communication links for forwarding data arriving over one link onto another link for transmission to an end system or another router.

Figure 2A:
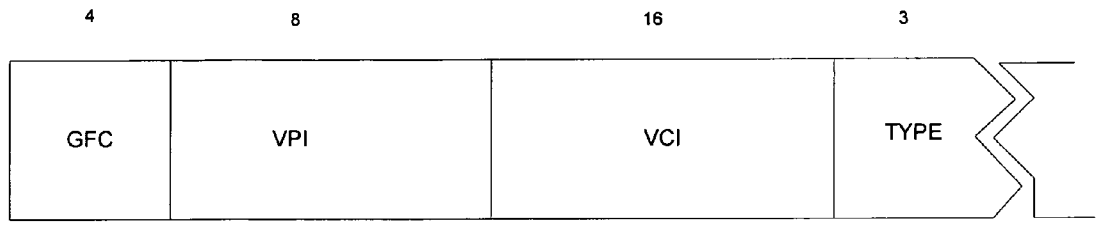
FIGS. 2A and 2B illustrate a data packet used in a packet switched network according to the invention.

FIG. 2A is an ATM cell format at the user-network interface (UNI). Starting with the left most byte of the cell the first four bits are for Generic Flow Control (GFC). The next 24 bits contain an 8-bit Virtual Path Identifier (VPI) and a 16-bit Virtual Circuit Identifier (VCI). The VPI/VCI is an identifier used to identify a virtual connection. The Type field has 3 bits and therefore eight possible values. Four of the values, when the first bit is set, relate to management functions. When the first bit is clear, it is an indication that the cell contains user data. In this case, the second bit is the "explicit forward congestion indication (EFCI) bit. The EFCI bit, when set, can be set by a congested switch to tell another node that it is congested.

The next bit is the Cell Loss Priority (CLP) bit that is used to indicate cells that should be dropped preferentially in the event of overload. The last byte of the header is an eight-bit Header Error Check.

Figure 2B:
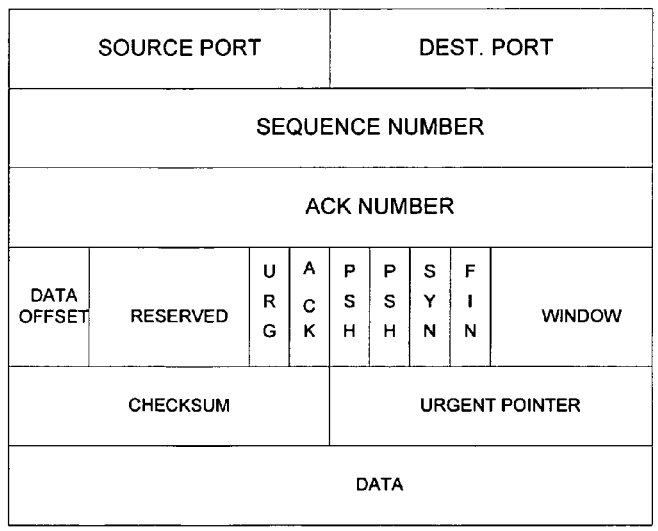

FIG. 2B is an illustration of a TCP header format of a TCP header. including Source Port Number, Destination Port Number, Sequence Number, Acknowledgment Number, Data Offset, Reserved Field for future use, Control Bits including URG (Urgent Pointer field significant), ACK (Acknowledgment field significant), PSH (Push Function), RST (Reset the connection), SYN (Synchronize sequence numbers) and FIN (no more data from sender), Window, Checksum, Urgent Pointer, Variable Options, and Padding. Acknowledgment Number may contain 32 bits for indicating the value of the next sequence number the TCP source is expecting to receive. Data Offset may contain 4 bits for indicating where the data begins. The Window may contain 16 bits for indicating the number of data octets beginning with the one indicated in the acknowledgment field which the TCP sender of the data segment is willing to accept. The Checksum may contain 16 bits for indicating the complement sum of all 16 bit words in the header and text. The Urgent Pointer may contain 16 bits for indicating the sequence number of the octet following the urgent data. The variable options may contain a multiple of 8 bits in length and may be included in the checksum. The variable header padding may be used to ensure that the TCP header ends and data begins on a 32 bit boundary. For purposes of Explicit Congestion Notification (ECN) to IP, one bit (preferably bit #9) in the Reserved Field of the TCP header 120B may be designated as the ECN-Echo flag so that the destination node can inform the source node when a congestion experienced (CE) packet has been received. Another bit (preferably bit #8) in the Reserved Field of the TCP header 120B may be designated as the Congestion Window Reduced (CWR) flag so that the source node can inform the destination node that the congestion window has been reduced and that the destination node can determine when to stop setting the ECN-Echo flag. In addition, bit #6 and bit #7 of the IPv4 TOS (Type of Service) octet may be designated as ECN-Capable Transport (ECT) bit and CE bit, respectively. ECT bit (or ECT flag) may be set by the source node to indicate that the end systems of the transport protocol are ECN-capable. In contrast, the CE bit (or CE flag) may be set by the intermediate node 130 to indicate congestion another node.

Figure 3:
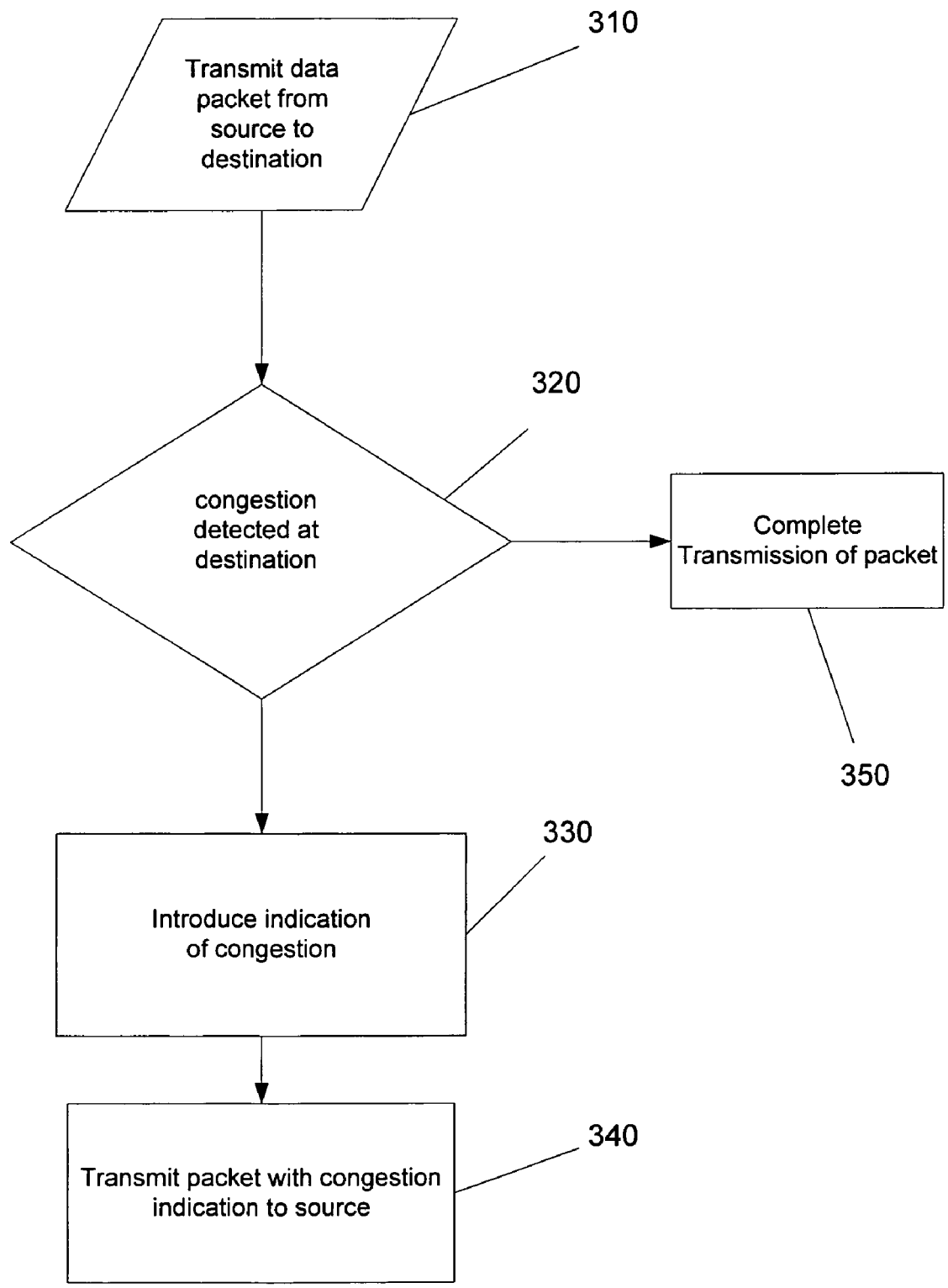
FIG. 3 is a flow diagram of an exemplary embodiment of the invention.

FIG. 3 is a flow diagram that illustrates an exemplary embodiment of the invention. In 310 the source node transmits a data packet to a destination node. The frames can be transmitted in accordance with for example, the ATM protocol or the TCP/IP protocol.

In 320 it is determined or detected that there is network congestion in the backwards direction of the received packet. The detection of congestion is accomplished by the various means discussed above such as the detection can be based on monitoring the transport delay and detecting the increase in it, or on monitoring the sequence of the received PDUs or packets and detecting a loss of PDUs or packets in the sequence. If there is no network congestion detected, the packet transmission proceeds as normal.

However, if network congestion is detected, an indication of congestion is introduced 330. The examples of congestion indication are discussed below. The way that congestion is indicated is dependent upon the type of protocol used or other factors that are recognized by those skilled in the art. In addition, network congestion is indicated in such a way, that it is known that the source of the network congestion is in the downlink direction of the destination node. In the exemplary embodiment, the congestion indication is an explicit congestion indication (ECI).

An example of introducing an indication of congestion is ECI. In this example, the indication is introduced into the EFCI field of the ATM, that was discussed above. Other examples of introducing ECI include, but are not limited to, introducing the indication into an AAL2 packet header or an Internet Protocol (IP) packet header.

Once the indication of congestion is introduced into the PDU or packet by the destination node, the source node of the packet is notified of the network congestion. The source node is notified of network congestion by receiving, from the destination node, a PDU or packet that includes the introduced indication of network congestion. As discussed above, the congestion indication is performed in such a way that indicates the direction of the source of the congestion. In another exemplary embodiment of the invention, the PDU or packet with the introduced congestion notification is sent directly to the source node from the destination node.

Once the source node is notified of network congestion, the source node can take steps in order to maintain an acceptable quality of service (QoS). For example the packet can be resent to the destination node.

According to another exemplary embodiment of the invention another way to indicate network congestion is to utilize a frame protocol. According to this embodiment, a new Frame Protocol Control frame or a Congestion Notification (CN) control frame is introduced for the congestion indication from the destination node to the source node. According to this embodiment there are four exemplary means for congestion indication.

The first means for congestion indication according to this exemplary embodiment is the mere presence of the CN control frame sent to the source node. Another means for congestion indication according to this exemplary embodiment is the presence of a binary flag carried in the CN control frame. In this example, the end of the congestion is indicated by either removing the binary flag, or by changing the value of the binary flag.

Still another means for congestion indication according to this exemplary embodiment, is the use of a new field in the payload of the CN control frame. The new field would indicate for example, the level or the severity of the detected congestion. This level/severity indication would further allow the destination node to apply appropriate measures for avoiding further congestion. For example, appropriate measures include but are not limited to, no reaction to the congestion, the reduction of the amount of data being transmitted, or stopping the transmission of data.

Still another means for congestion indication according to this exemplary embodiment, is the use of the payload section of the CN control frame. According to this example, the payload section is used to indicate both the level/severity of the congestion, as well as, the user or radio cell that is the originator of the data that caused the congestion.

In another exemplary embodiment is another means to notify the source node of congestion. According to this exemplary embodiment a corresponding application protocol is used for signalling the congestion notification to the source of the data. On Iub (the interface between a radio network controller and a node B) the application protocol is NBAP (node B application part) while on Iur (the interface between radio network subsystems and a system) it is RNSAP (radio network system application part). The NBAP and RNSAP are protocols of the UTRAN Radio Network Layer. In either case, a new message or one of the existing messages, is introduced in the application protocol by introducing a new information element (IE) called an Congestion notification IE, into the existing or new message. The NBAP/RNSAP allows the signalling of both congestion notification, level of congestion and the originator of the congestion (user, MAC-d flow, radio cell etc.).

Figure 4:
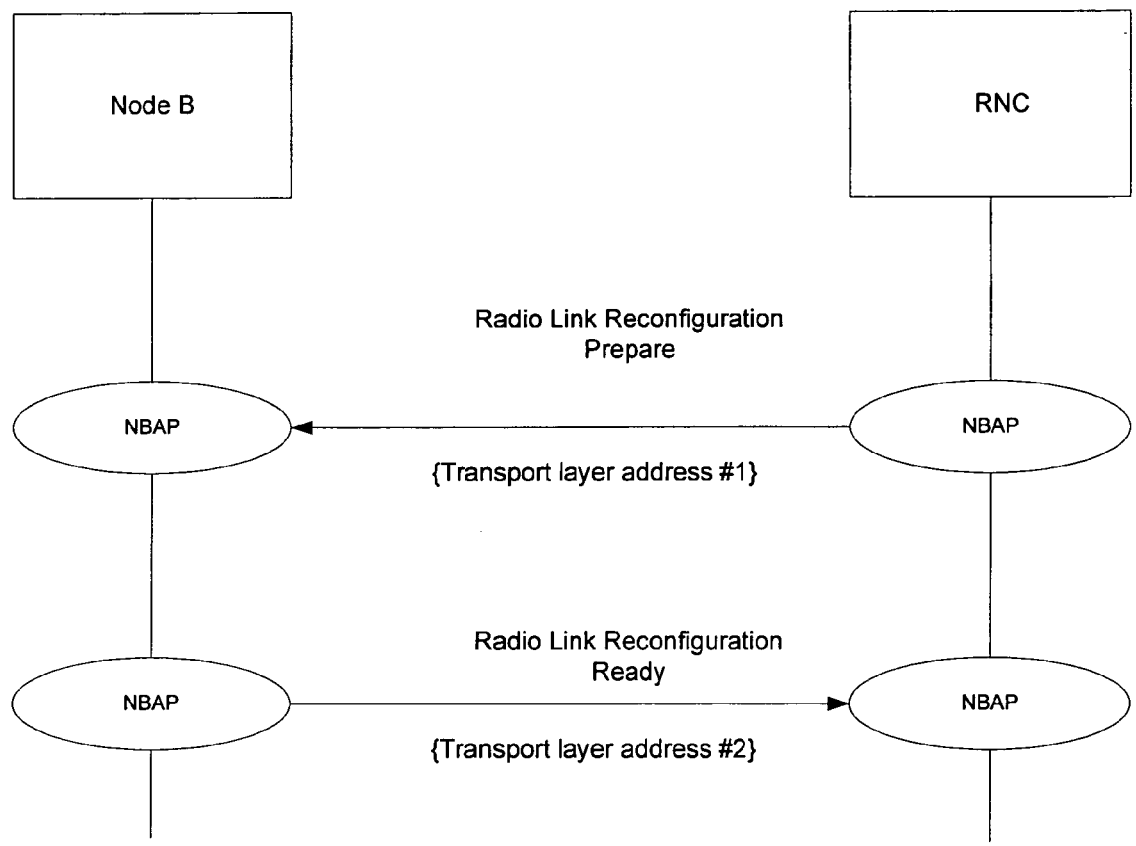
FIG. 4 is an exemplary illustration of a signaling diagram.

FIG. 4 is an exemplary illustration of a signaling diagram according to the NBAP protocol. In the Radio Link Reconfiguration Prepare message of the NBAP protocol, the transport layer address #1 is sent in an IE from the RNC to the Node B. Then, the Radio Link Reconfiguration Ready signaling message of the NBAP protocol is used to send the transport layer address #2 and the congestion indication of the Node B in the IE from Node B to the RNC. The new IE servers as a container for the congestion indication. A similar set of messages can be utilized using the RNSAP protocol.

Figure 5:
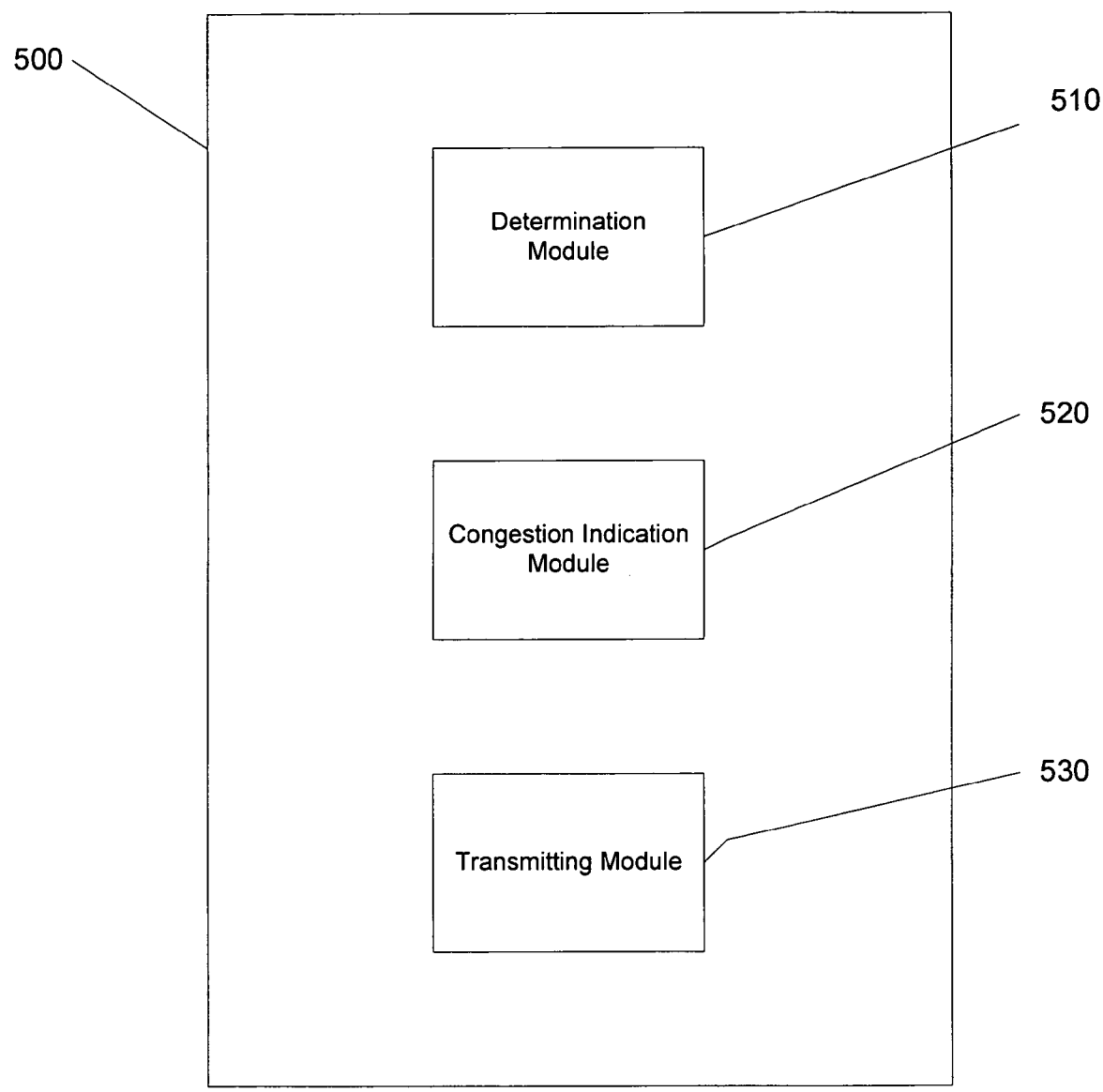
FIG. 5 is an illustration of a system according to an exemplary embodiment of the invention.

FIG. 5 is an illustration of a system according to an exemplary embodiment of the invention. The system 500 notifies the source node of network congestion. The system 500 includes three components. The first component is the determination module 510. The determination module 510 determines if there is detected network congestion. The various ways that congestion is detected as discussed above, include but are not limited to such as monitoring the transport delay and detecting the increase in it, or on monitoring the sequence of the received PDUs or packets and detecting a loss of PDUs or packets in the sequence.

According to this exemplary embodiment the system further includes a congestion indication module 520. The congestion indication module 520 introduces the congestion indication into the PDU or packet once network congestion has been detected.

The system, according to this exemplary embodiment further includes a transmitting module 530. The transmitting module sends the PDU or packet containing the congestion indication, to the source node. After the source node receives the PDU or packet, appropriate steps can be undertaken to relieve the congestion. Methods or systems for relieving network congestion are known in the art.

One having ordinary skill in the art will readily understand that the invention as discussed above may be practiced with steps in a different order, and/or with hardware elements in configurations which are different than those which are disclosed. For example, the present invention may be implemented at least as a computer product including computer-readable code, a chip set or ASIC, or a processor configured to implement the method or system. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method, comprising:
receiving data packets at a destination node from a source node;
determining whether congestion is encountered at the destination node;
introducing an indication of network congestion in a control frame at the destination node; and
transmitting the control frame from the destination node to a source node as the indication of network congestion, wherein at least one field of the control frame includes the indication of network congestion,
wherein the introducing of the indication of network congestion comprises providing an explicit congestion indication as the indication of network congestion, and
wherein the introducing of the indication of network congestion comprises providing the explicit congestion indication of congestion detected in at least one of an Iub interface and an Iur interface in accordance with a terrestrial radio access network (UTRAN).

2. The method of claim 1, wherein the transmitting of the control frame is in accordance with an Asynchronous Transfer Mode (ATM) protocol.

3. The method of claim 2, wherein the introducing of the indication of network congestion comprises introducing the explicit congestion indication in the Asynchronous Transfer Mode Adaptation Layer (AAL2) header.

4. The method of claim 1, wherein the transmitting of the control frame is in accordance with an Internet protocol (IP).

5. The method of claim 4, wherein the introducing of the indication of network congestion comprises introducing the explicit congestion indication into an IP packet header.

6. The method of claim 1, wherein the transmitting of the data packet further comprises including a binary flag in the control frame, and wherein the binary flag is the indication of network congestion.

7. The method of claim 1, wherein the transmitting of the control frame further comprises including a new field in a payload portion of the control frame as the indication of network congestion, and
wherein the new field indicates a level of severity of the network congestion.

8. The method of claim , wherein the transmitting of the control frame further comprises the new field further including an indication of an originator of data that caused the congestion.

9. The method of claim 1, wherein the transmitting of the control frame comprises using an application protocol to include the indication of network congestion.

10. An apparatus, comprising:
determining means for determining when congestion is encountered of received data packets;
insertion means for introducing an indication of network congestion in a control frame at a destination node; and
transmitting means for transmitting the control frame from the destination node to a source node as the indication of network congestion, wherein at least one field of the control frame includes the indication of network congestion,
wherein the indication of network congestion inserted by the insertion means comprises an explicit congestion indication, and
wherein the insertion means provides the explicit congestion indication of congestion detected in at least one of an Iub interface and an Iur interface in accordance with a terrestrial radio access network (UTRAN).

11. The apparatus of claim 10, wherein the transmitting means transmits the control frame in accordance with an Asynchronous Transfer Mode (ATM) protocol.

12. The apparatus of claim 10, wherein the transmitting means transmits the control frame in accordance with an Internet protocol (IP).

13. The apparatus of claim 12, wherein the insertion means introduces the explicit congestion indication into an IP packet header.

14. A system, comprising:
a determination module configured to determine network congestion upon the receipt of a control frame;
a congestion indication module configured to introduce an indication of network congestion in the control frame at a destination; and
a transmitting module configured to transmit the control frame from the destination to a source as the indication of network congestion, wherein at least one field of the control frame includes the indication of network congestion,
wherein the indication of network congestion inserted by the congestion indication module comprises an explicit congestion indication, and
wherein the congestion indication module is configured to provide the explicit congestion indication of congestion detected in at least one of an Iub interface and an Iur interface in accordance with a terrestrial radio access network (UTRAN).

15. The system of claim 14, wherein the congestion indication module is configured to introduce an indication of network congestion that is an explicit congestion notification.

16. An apparatus, comprising:
a determiner configured to determine when congestion is encountered of received data packets;
an insertion unit configured to introduce an indication of network congestion in a control frame at a destination node; and
a transmitter configured to transmit the control frame from the destination node to a source node as the indication of network congestion, wherein at least one field of the control frame includes the indication of network congestion,
wherein the indication of network congestion inserted by the insertion unit comprises an explicit congestion indication, and
wherein the insertion unit is configured to provide the explicit congestion indication of congestion detected in at least one of an Iub interface and an Iur interface in accordance with a terrestrial radio access network (UTRAN).

17. The apparatus of claim 16, wherein the control frame is transmitted in accordance with an Asynchronous Transfer Mode (ATM) protocol.

18. The apparatus of claim 16, wherein the control frame is transmitted in accordance with an Internet protocol (IP).

19. The apparatus of claim 18, wherein the insertion unit is configured to introduce the explicit congestion indication into an IP packet header.

20. A computer program embodied on a computer readable storage medium, the computer program being configured to control a processor to perform:
receiving data packets at a destination node from a source node;
determining whether congestion is encountered at the destination node;
introducing an indication of network congestion in a control frame at the destination node; and
transmitting the control frame from the destination node to a source node as the indication of network congestion, wherein at least one field of the control frame includes the indication of network congestion,
wherein the introducing of the indication of network congestion comprises providing an explicit congestion indication as the indication of network congestion, and
wherein the introducing of the indication of network congestion comprises providing the explicit congestion indication of congestion detected in at least one of an Iub interface and an Iur interface in accordance with a terrestrial radio access network (UTRAN).

* * * * *